United States Patent [19]

Newman, Sr. et al.

[11] Patent Number: 4,993,101
[45] Date of Patent: Feb. 19, 1991

[54] TOOL SYSTEM WITH ROTATABLE TOOL

[75] Inventors: Robert D. Newman, Sr.; Robert D. Newman, Jr., both of Greenwood, Mo.

[73] Assignee: Mr. Longarm, Inc., Greenwood, Mo.

[21] Appl. No.: 421,018

[22] Filed: Oct. 12, 1989

[51] Int. Cl.⁵ ............................................... A47L 1/06
[52] U.S. Cl. .................................. 15/245; 15/144 R; 15/145; 403/121; 403/361
[58] Field of Search .................. 15/144 R, 145, 176.6, 15/117, 245, 172; 81/489; 16/110 R, 114 R; 403/121, 334, 361

[56] References Cited

U.S. PATENT DOCUMENTS

| | | | |
|---|---|---|---|
| 275,914 | 4/1883 | Hood | 15/145 |
| 3,682,516 | 8/1972 | Savage | 15/145 |
| 3,737,187 | 6/1973 | Pryor | 15/144 R |
| 4,236,270 | 12/1980 | Mavis | 15/245 |
| 4,471,507 | 9/1984 | Schwartz | 15/176.6 |
| 4,672,706 | 6/1987 | Hill | 15/167.1 |
| 4,777,694 | 10/1988 | Young | 15/245 |
| 4,811,445 | 3/1989 | Lagieski et al. | 15/176.6 |

FOREIGN PATENT DOCUMENTS 276297 2/1966 Australia .......................... 15/144 R Primary Examiner—Edward L. Roberts
Attorney, Agent, or Firm—Hovey, Williams, Timmons & Collins

[57] ABSTRACT

Tool system (10) advantageously provides tool (12), adapter (14) and extension member (16) successively coupled so that groove (34) mates with rib (44) in the assembled position. Groove (34) and rib (44) are engaged so that tool (12) is axially fixed relative to adapter (14) yet is axially rotatable relative thereto. In preferred embodiments adapter body (36) includes a shoulder (42), and adapter (36) and handle member (20) are correspondingly tapered with increasing radius from top to bottom so that the snapping, engaging action of handle member (20) on adapter head (36) is enhanced when the system (10) is assembled.

5 Claims, 1 Drawing Sheet

TOOL SYSTEM WITH ROTATABLE TOOL

BACKGROUND OF THE INVENTION

1. Field of the Invention

This invention relates to a tool system used for working on inaccessible places such as multiple-story-building windows and the like. More particularly, it is concerned with a tool system having an adapter receiving a tool which is axially fixed but axially rotatable relative to the adapter.

2. Description of the Prior Art

The need to reach elevated inaccessible places such as upper story windows, movie theater marquees and the like has resulted in specialized tools for such purposes. In particular, devices have been developed in which there is an assembly of one or more pole elements coupled with a tool used for working on the job surface. None of these devices, however, has provided a mechanism for rotational movement of the tool with respect to the pole and hence reduce the amount of body repositioning required of the user. For example, when a window washer is suspended above ground in the course of washing windows, convenience, not to mention safety, dictates that rotational adjustment of the tool relative to the washer's body would be logistically preferable to awkard bodily compensation for the various angles required to wash a large surface. Particularly inconvenient is the situation where the washer desires to make a vertical cleaning stroke from above his head to below his feet. In the course of such a stroke, with the prior devices, it was necessary for the washer to break contact between the tool and the working surface in order to reorient the tool system so as to complete the lower portion of the stroke. Other limitations of such nonrotatable tools will readily suggest themselves to those skilled in the art.

What is needed is a device which includes a tool rotatably mounted so as to substitute device movement for bodily movement and thus allow the user to work in a more effective manner. A number of devices for working on inaccessible surfaces has been proposed in the past. One such device is illustrated by U.S. Pat. No. 4,427,140.

SUMMARY OF THE INVENTION

The problems outlined above are in large measure solved by the tool system in accordance with the present invention. That is to say, the system hereof is easily assembled, provides for rotatable movement of the tool against the working surface and does so in a manner whereby the tool may be used in a more complementary fashion with respect to the user's body.

The tool system in accordance with the present invention broadly includes a tool, an elongated adapter which receives the tool, and an extension member for reaching inaccessible places. The tool has an inner surface forming a female groove which matingly engages a circumferential rib formed on the adapter.

In preferred forms, the adapter includes a shoulder formed below the circumferential rib, and the adapter and tool are complementally tapered from top to bottom so as to have conforming, increasing radii. In particularly preferred forms, the extension member includes a curved portion for cooperatively interacting with the rotatable movement of the tool.

DESCRIPTION OF THE PREFERRED EMBODIMENT

Figure 2:
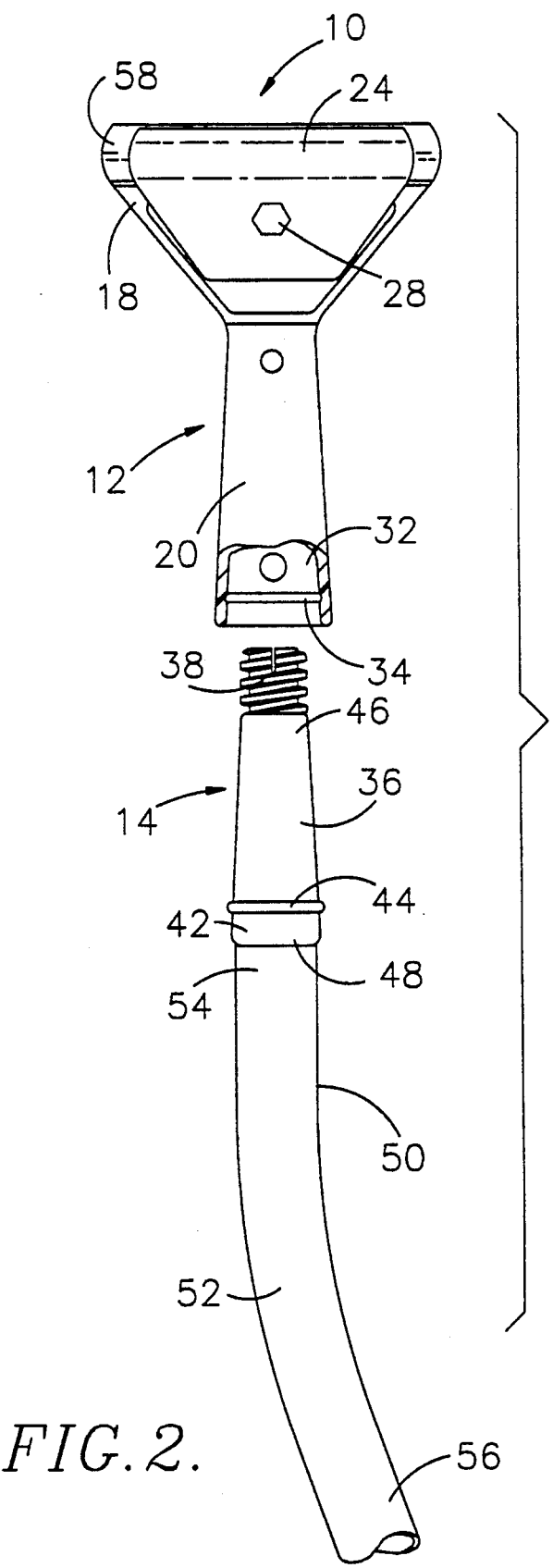
FIG. 2 is a partial, exploded front view of the preferred tool system in accordance with the present invention.

Referring now to the drawing in general, and FIG. 2 in particular, the tool system 10 in accordance with the invention broadly includes tool 12, elongated adapter 14 and extension member 16. Tool system 10 is used for working on a surface area such as a building window or the like. It will be readily understood that there are many other applications for system 10, and virtually any environment with inacessible or elevated work places will quite possibly have suitable uses.

Figure 1:
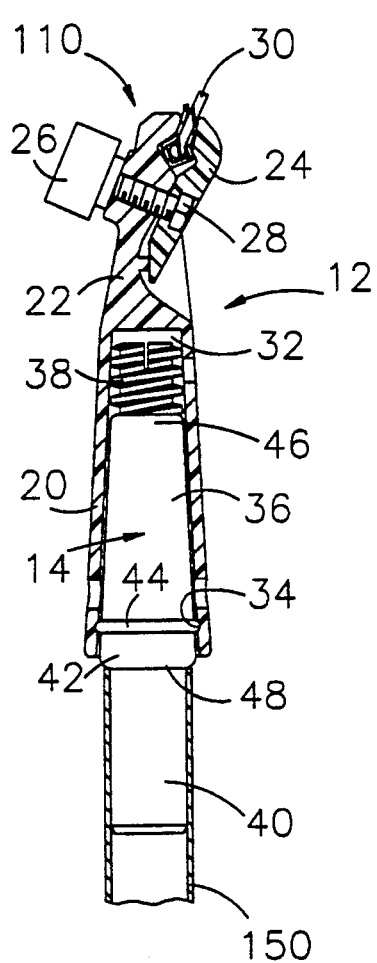
FIG. 1 is a partial, sectional side elevational view of an alternative embodiment of the present invenition

In more detail, tool 12 includes functional member 18 and hollow handle member 20. Referring to FIG. 1, functional member 18 is seen to be further divided into frame 22 and jaw member 24, both of which are suitably, threadedly apertured for receiving tightening bolt 26 and nut 28.

With reference to the assembly of tool system 110 of FIG. 1 it will be noted that separate jaw member 24 can be tightened to frame 22 by virtue of the action of bolt 26 and nut 28 and then squeegee blade 30 may be suitably inserted therein. Handle member 20 presents an inner surface 32 including portions forming a female groove 34.

Still referring to FIG. 1, adapter 14 includes an adapter head 36 having an upper threaded portion 38 and an adapter body 40. In preferred forms adapter head 36 is tapered to conform with handle member 20. Adapter head 36 further includes a shoulder 42 and circumerential rib 44 which is axially placed to mate with female groove 34 in the assembled position (female groove 34 is slightly upwardly displaced from rib 44 in FIG. 1 simply for ease of illustration and it will be readily understood that when assembled, the groove 34 and rib 44 mate. The taper of adapter head 36 will easily be observed by comparing the relative diameters of upper end 46 and lower end 48.

Referring once again to FIG. 2, extension member 16 including a pole 50 which is nonrotatably secured on adapter 14. Pole 50 may be attached to adapter 14 by a glue or adhesive or the like, or can also be releasably, mechanically fixed by any number of devices known and practiced in the art. Alternatively, an adapter structure having the shape of adapter 14 and extension member 16 could be integrally formed so that the system simply included a tool and an adapter structure.

In any event, pole 50 has a curved portion 52 depending from connection end 54, and an elongated shaft 56 depending from the curved portion 52. Although only a portion of elongated shaft 56 is shown it will be readily understood that any length could be used for shaft 56 and that other connective apparatus could be attached to the end distal from connection end 54 so that a series of poles could be attached together.

In the alternative embodiment of system 110, pole 150 is substantially linear, there being no curved portion. While pole 50 with curved portion 52 is preferred, there may be instances where a substantially straight pole such as pole 150 is needed.

In operation, the adapter 14 and tool 12 are connected at rib 44 and groove 34 to form a tool assembly. Handle member 20 can be formed of any suitably durable material such as a metal or synthetic resin, so long as the lower portions of handle member 20 are sufficiently flexible to snap over and resiliently engage rib 44. Further, the surface interaction of inner surface 32 with the exterior surface of adapter head 36 must be sufficiently low in friction that advantageous relative rotation can occur.

It will be readily appreciated that for some tasks the tool assembly consisting of the adapter 14 and tool 12 may have utility in and of itself, particularly if adapter body 40 is long enough to serve as a handle. Normally, however, the user will complete assembly of the system 10 by securing pole 50 to adapter 14. It may also be desirable to attach such appurtenances as squeegee blade 30.

When the system 10 is assembled, the user is ready to begin working on a surface. Not only will the user have the benefit of the length provided by poles 50, 150 but he will also have the inventive benefit of rotatable tool 12. Thus, when working on the surface, the user needs merely exert a force on one end only of functional member 18 as at 58 by selectively pressing that portion of functional member 18 against the working surface so as to torque tool 12 in the desired direction. Tool 12 will rotate freely about adapter 14 at rib 44 for the desired result.

One important phenomenon associated with this pivoting aspect of the invention is that in completing a substantially vertical stroke on a working surface, the user will be able to continue his stroke motion in a direction from, for example, above his waist to below his waist without having to remove the functional member 18 from the working surface. This is because as the user adjusts his arms to continue his stroke in a downward motion in the area substantially below his waist, he can do so without removing functional member 18 from the working surface because the tool 12 will advantageously rotate to accomodate the shifting orientation of pole 50 in relation to the working surface.

It will be appreciated that tool system 110 as depicted in FIG. 1 will not as facilely perform this pivoting adjustment because of the lack of a curved portion 52 as incorporated in tool system 10. Nevertheless, both embodiments 10, 110 feature the advantageous pivoting action of tool 12.

We claim:
1. A tool system comprising:
   an elongated adaptor presenting a longitudinal axis and including an adaptor head having a body portion presenting a circumferential rib disposed about the exterior thereof;
   a tool including a functional member and a hollow handle member presenting an inner surface for rotatably receiving said adaptor head therein integrally depending from said functional member, the inner surface including a portion forming a female groove; and
   elongated extension member presenting a curved portion and having a connection end non-rotatably secured within said adaptor,
   said inner surface of said handle being configured to receive a portion of said adaptor head including said circumferential rib therein for pivotal movement of said tool about said longitudinal axis, said female groove of said tool releasably, matingly receiving said rib whereby said tool is axially fixed relative to said adaptor, the fit between said handle and said adapter when said rib is received in said groove being sufficiently low in friction to permit relative pivotal movement therebetween.

2. A tool system as set forth in claim 1, wherein said functional member is oriented transversely to said longitudinal axis.

3. A tool system as set forth in claim 2 wherein said functional member is releasably mounted to said tool.

4. A tool system as set forth in claim 3 wherein said functional member is a squeegee blade.

5. A tool system as set forth in claim 1 wherein said adapter head includes a threaded portion, said inner surface of said hollow handle member being configured to receive said threaded portion therein when said rib is located in said groove with said tool being rotatable above said longitudinal axis when said rib is located in said groove.

* * * * *